United States Patent [19]
Ferguson et al.

[11] Patent Number: 5,210,872
[45] Date of Patent: May 11, 1993

[54] CRITICAL TASK SCHEDULING FOR REAL-TIME SYSTEMS

[75] Inventors: Edward E. Ferguson, Plano; Dexter S. Cook, Carrollton, both of Tex.

[73] Assignee: Texas Instruments Inc., Dallas, Tex.

[21] Appl. No.: 722,776

[22] Filed: Jun. 28, 1991

[51] Int. Cl.⁵ .............................................. G06F 9/46
[52] U.S. Cl. ............................ 395/650; 364/DIG. 1; 364/281.7; 364/281.8; 364/259.2; 364/230.3; 364/231.6
[58] Field of Search ............ 364/DIG. 1 MS File; 395/650

[56] References Cited

U.S. PATENT DOCUMENTS

| | | | |
|---|---|---|---|
| 3,648,253 | 3/1972 | Mullery et al. | 364/DIG. 1 |
| 4,035,778 | 7/1977 | Ghanem | 364/DIG. 1 |
| 4,262,331 | 4/1981 | Freeland et al. | 364/DIG. 1 |
| 4,954,948 | 9/1990 | Hira et al. | 364/DIG. 1 |
| 4,989,133 | 1/1991 | May et al. | 364/DIG. 1 |

*Primary Examiner*—Thomas M. Heckler
*Attorney, Agent, or Firm*—Frank J. Kowalski; Leo N. Heiting; Richard L. Donaldson

[57] ABSTRACT

A task scheduling method for a real time computer system having automatic memory management or some other resource that is consumed in terms of a bit rate. The method ensures that non critical tasks do not prevent the timely execution of critical tasks. Each task is evaluated in terms of its rate of consumption of the resource. This rate is controlled by assigning each task a consumption quota and keeping track of the consumption of each task as it executes. The task is required to relinquish its processor time if it attempts to consume more than its quota.

20 Claims, 5 Drawing Sheets

TASK PARAMETERS

| NAME | PERIOD | EX. TIME | % | MAX ALLOC. RATE | % | QUOTA | CONSUMED |
|---|---|---|---|---|---|---|---|
| GC | 1.0 | 0.1 | 10 | - | - | - | - |
| T1 | 0.5 | 0.1 | 20 | 0.40 | 20 | 0.2 | 0.1 |
| T2 | 1.0 | 0.1 | 10 | 0.30 | 15 | 0.3 | 0.2 |
| T3 | 1.0 | 0.1 | 10 | 0.30 | 15 | 0.3 | 0.2 |
| T4 | 0.5 | 0.15 | 30 | 0.60 | 30 | 0.3 | 0.5 |
| T5 | 1.0 | 0.2 | 20 | 0.40 | 20 | 0.4 | 0.2 |

Fig. 6

CRITICAL TASK SCHEDULING FOR REAL-TIME SYSTEMS

TECHNICAL FIELD OF THE INVENTION

This invention relates to real time systems, and more particularly to a real-time computer operating system for ensuring timely execution of critical tasks.

BACKGROUND OF THE INVENTION

Computer systems are an integral part of real-time systems. These computers systems are "embedded" in the sense that they monitor and control other equipment in the system. Because they operate in step with the equipment, they are said to be operating in real time.

A dominant characteristic of real time systems is that the system must respond to some external stimulus within some "short" time interval. How short this interval must be depends on the nature of the problem being solved and the equipment being used. Another characteristic of a typical real time system is that it must be capable of responding to more than one external stimulus at essentially the same time.

In a real-time systems, the processes that handle system responses are referred to as "tasks". Those tasks having deadlines that must be met in this manner are referred to as "critical" tasks. In order to ensure that critical tasks meet their deadlines, the computer operating system must include an appropriate scheduling algorithm.

One approach to scheduling is that used in conventional general purpose operating systems. These systems are generally concerned with allocation of processor time. A commonly used technique is allocating processing time to application processes, using some sort of time slicing algorithm. Each time the allocated time for a process expires, the execution of that process is suspended and the next process is permitted to run.

A recent development in real-time systems is the use of memory management support software, with which the user may dynamically allocate and deallocate storage for objects. Some of these memory management tools are automatic in the sense that they determine when an application program no longer uses storage and then reclaim it. The component that performs the reclaiming service is called a "garbage collector".

In systems having automatic memory management, the capacity of the memory management process to reclaim memory is limited to a particular rate, usually expressed as bits per second. Thus, like a processor, the memory management system is a resource, whose capacity must be scheduled. If both critical and non-critical tasks consume the resource, there is a danger that a critical task may miss a deadline because it must wait to acquire a resource that has been depleted by a non-critical task.

However, conventional processor scheduling techniques are not suitable for scheduling memory allocation. In contrast to processor availability, the availability of allocated memory is a function of a rate of consumption. Also, inherent in dynamic memory allocation is the characteristic that memory consumption can change according to system conditions, and can be difficult to predict. A need exists for a method of scheduling real-time computer systems having automatic memory management so that noncritical tasks do not interfere with critical task deadlines.

SUMMARY OF THE INVENTION

One aspect of the invention is a method of scheduling tasks to be executed by a real time embedded computer system, which has a resource that is consumed in bits per unit of time, such as a dynamically allocated memory or a communications link. Each currently executing task has a maximum allocation value, which is stored in the computer's memory. This maximum allocation value represents the maximum number of bits that the task may consume per activation. As the task runs, its consumption, in bits, of the resource is counted. The counted consumption value is compared to the task's maximum allocation value. If the counted consumption value exceeds the maximum allocation value, a signal is delivered to a scheduler, indicating that the task must discontinue execution until the beginning of that task's next period. By controlling how often a task executes, the scheduling method indirectly controls the maximum rate at which the task can consume a resource.

A technical advantage of the invention is that it may be used to ensure that resource consumption by non-critical tasks does not prevent the timely performance of critical tasks. It is not necessary to analyze the rates of consumption of non-critical tasks; rather an upper bound is put on the rate at which they are permitted to consume the resource. Non-critical tasks can be added to the system without degrading system performance because the total resource consumption rate of such tasks is within a limit remaining after the rate of consumption for critical tasks has been determined.

BRIEF DESCRIPTION OF THE DRAWINGS

FIG. 6 is a table illustrating task parameters of tasks to be scheduled using the invention.

DETAILED DESCRIPTION OF THE INVENTION

Figure 1:
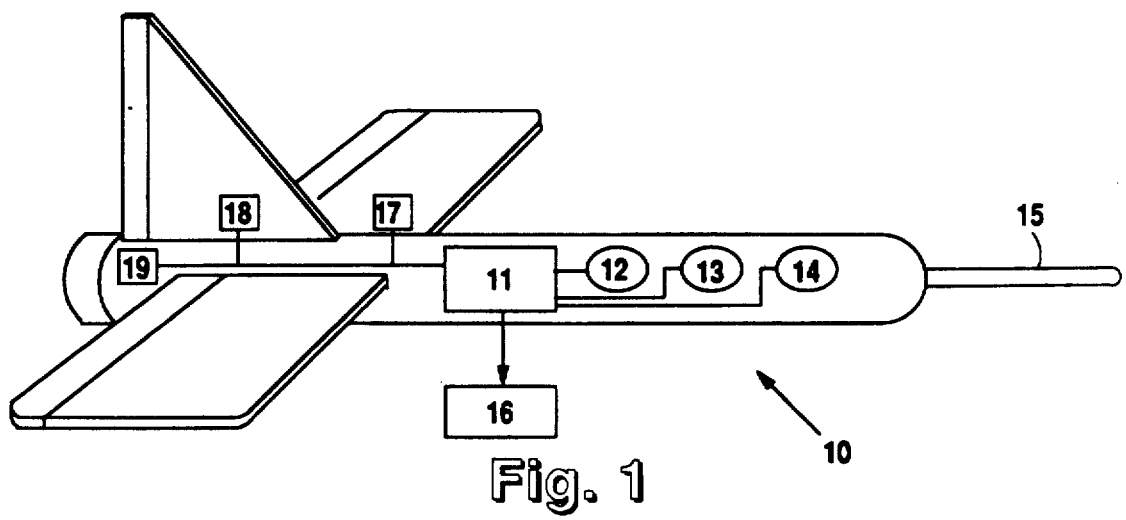
FIG. 1 is a block diagram of an aircraft having an embedded real-rime computer system.

FIG. 1 is an illustration of an embedded real-time computer system. An airborne vehicle 10 has a computer system 11, connected to sensors 12-15. Using sensors 12-15, computer system 11 obtains data pertaining to flight conditions of vehicle 10, such as altitude, air speed, direction, and radar data. Computer software resident in computer system 11 analyzes this data and advises the pilot via output devices 16, or alternatively, provides control data to an automatic control system. In the latter case, computer system 11 has access to control devices, such as actuators 17-19 for elevators, rudder, and throttle.

Computer system 12 operates in hard real-time, meaning that computer programs executing on computer system 11 have critical deadlines. In other words, it is not only desirable to meet these deadlines, but failing to do so can result in dire consequences.

Figure 2A:
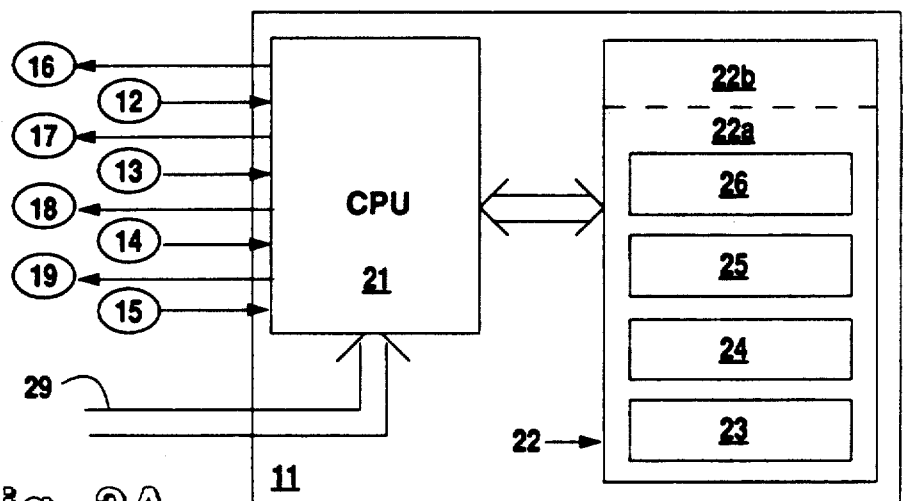
FIGS. 2A and 2B illustrate software with which the embedded computer system of FIG. 1 is programmed.

FIG. 2A illustrates an example of computer system 11. Computer system 11 includes a central processing unit 21, which is connected to memory 22. Memory 22 has both a program storage area 22A and a data storage area 22B. memory 22A stores various programs 23-26. Some of these programs are application programs 23 and 24, which generate output to output devices 16 or to actuators 17-19 or analyze data from sensors 12-15. Other programs are operating system programs, such as job scheduler 25 and garbage collector 26.

Figure 2B:
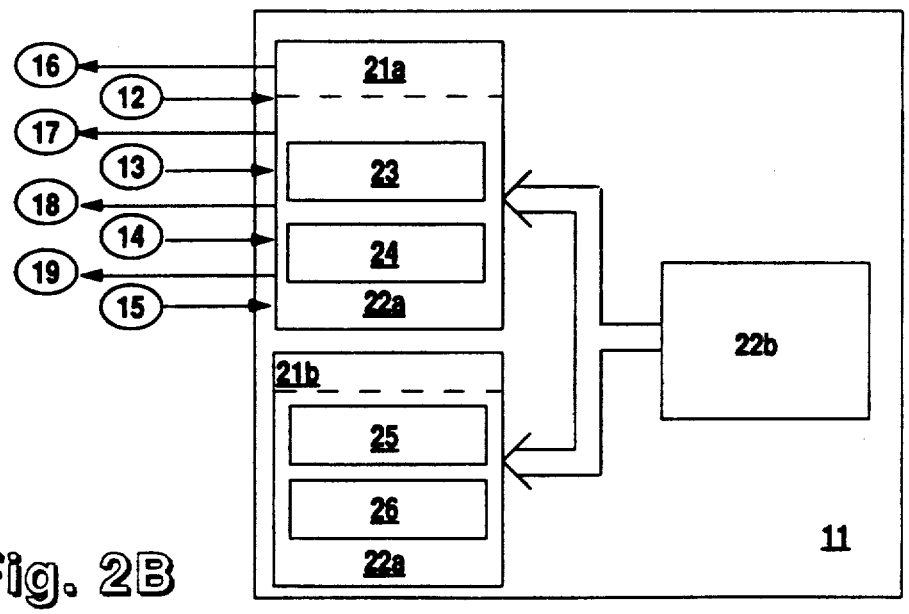

FIG. 2B illustrates an alternative embodiment of computer system in which there is more than one processor. A first processor 21a executes application programs 23 and 24, whereas a second processor 21b executes operating system programs 25 and 26.

Scheduler 25 is a program that makes decisions as to which tasks should be assigned to processor 21 at any one time. All tasks are in one of three states: running, blocked, or ready. Each of the latter two states is associated with a task queue. Scheduler 25 controls the movement of tasks from one queue to the other, and the movement of tasks to and from processor 21. A feature of the invention is that it bases its decisions on memory allocation data, as explained below in connection with FIG. 5.

Garbage collector 26 is part of automatic memory management software, with which computer system 11 is programmed. Garbage collector 26 reclaims memory in data memory 22B at a discernable rate. To ensure that garbage collector 26 is effective, the rate at which application programs allocate storage must be less than the rate at which garbage collector 26 reclaims it. One technique for automatic memory management is described in pending U.S. patent application Ser. No. 07/682,806, Attorney Docket #TI-13685, which is incorporated herein by reference.

Figure 3:
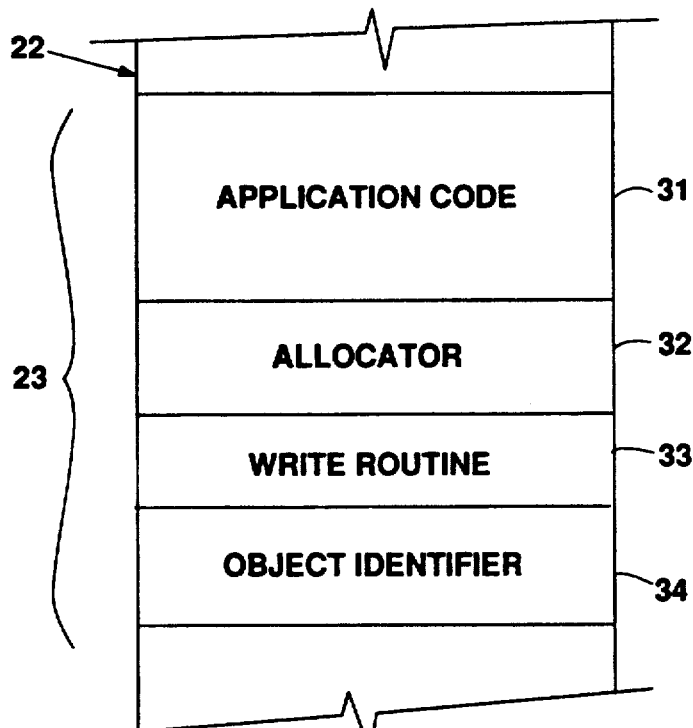
FIG. 3 illustrates the program modules of an application program.

FIG. 3 illustrates a portion of memory 22, which stores an application program, such as application program 23. Application program 23 may be written in any language that supports dynamic memory allocation and automatic reclaiming. Two examples of languages of this type are the LISP and Smalltalk programming languages.

Application program 23 has a number of modules, including application code 31, allocator 32, write routine 33, and object identifier 34. The general operation of these modules is in accordance with known computing techniques. Allocator 32 is responsible for memory allocation. Write routine 33 manages the necessary overhead With Which application code 31 must contend to accomplish real time memory management.

The above-described real-time system is used for illustration, and the invention is useful with any realtime system having an embedded computer system with automatic memory management. Thus, the resources of computer system include dynamically allocated and reclaimed storage, as well as processor time.

In general, computer system 11 may have any number of such resources, which are characterized by having bounded capacity. Thus, memory 22 may be reclaimed at n bits per second, and processor 21 may operate at n cycles per second. Processor 21 and memory 22 are examples of two resources; another example is an input/output communications link 29, which may be consumed at a certain number of bits per second.

Some resources, such as processor 21, are available as a discrete unit, with allocation being a function of time slicing. Other resources, such as memory 22 and communications link (not shown) may be allocated as a function of size as well as time, i.e., as a function of a consumption rate. For example, a resource that may be consumed at 1 megabit per second may be partitioned among two tasks, each of which have a consumption rate of 1 megabit per second, which run once per second for 0.5 second.

As illustrated in FIGS. 2A and 2B, more than one application program may be stored in memory 22. Also, the operating system of computer system 11 may include more than one program. As explained below, regardless of the number of programs, there are a number of application tasks and system tasks to be executed. Some tasks are critical, which means that they must be performed within a certain deadline in order for the real-time system to be successful. Critical tasks generally include those that process data that arrive periodically from sensors 12-15 and those that output data to output devices 16 or to actuators 17-19. Other tasks are non-critical, which means that they have no definite deadlines for execution. For example, another program might handle diagnostic routines, whose performance may be delayed until resources are available.

Each task has a lower bound on the duration of the time interval that must elapse between the times at which instances of that task become eligible to execute. This duration is called the period of the task. Thus, if a task with period P is released for execution at time T, its next release does not occur before time T +P. For example, one program might require that data from sensor 12 be collected once every second. Thus, this task of collecting data has a period of 1 second.

Another characteristic of tasks is that each consumes one or more resources. It is assumed that each task's resource request is within the capacity of the resource. In other words, no task makes such a large request that it cannot be honored without exceeding the instantaneous capacity of the requested resource. Non-critical tasks tend to have less predictable resource consumption, a characteristic which the invention is designed to accommodate.

During system design, a system designer assigns each task to be performed by computer system 11 a critical versus non-critical status. Each critical task is associated with a task period and a maximum allocation rate, which is known to be adequate for satisfactory performance. In other words, each critical task is given enough time at sufficiently frequent intervals to meet its system deadlines.

By assigning each task a minimum time between activations, the allocation rate is converted to a maximum allocation per task activation. For example, using the data collection example, the task of collecting data from sensor 12 once per second might require 0.1 second for performance and allocate a maximum of 0.2 megabit of memory 22 during each activation.

Then, the total resource consumption of the critical tasks is calculated. It is assumed that this rate does not exceed the resource capacity of the system. For example, it might be determined that in a system having a memory reclaiming capacity of 1 megabit per second, the critical tasks require 0.6 megabit per second.

After critical tasks have been allocated, the remaining resource capacity is determined. This remaining resource capacity is treated as available for non-critical tasks. Then, each non-critical task is associated with a quota. Thus, if the system has five non-critical tasks to be performed each second, each might be permitted to use a maximum of 0.2 megabit per task activation. In the preferred embodiment, both the amount of processor time and the amount of allocated memory of a non-critical task are limited, so that if a non-critical task exceeds either limit, it must relinquish processor 21.

Figure 4:
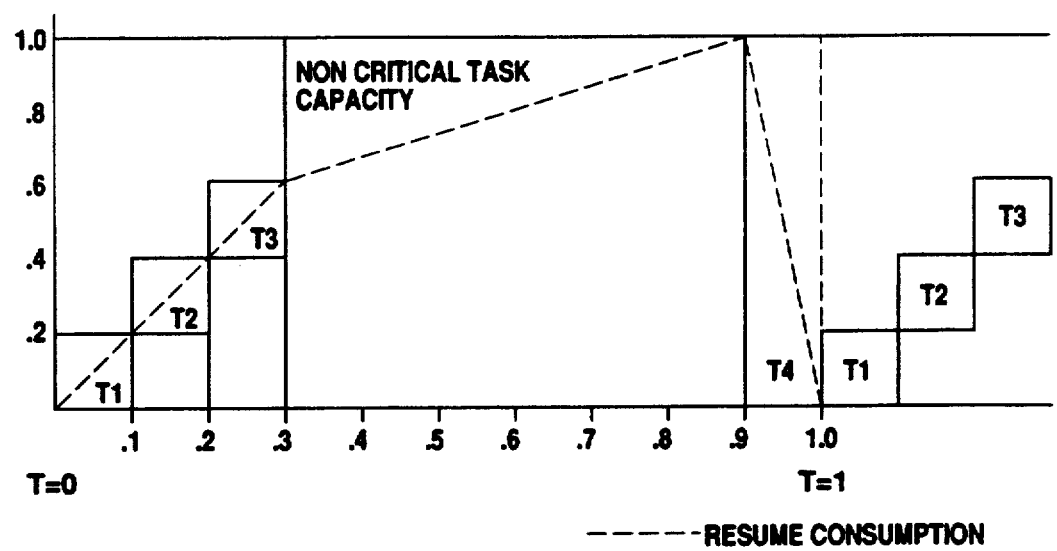
FIG. 4 illustrates an example of partitioning a resource that is consumed in bits per unit of time.

FIG. 4 illustrates memory allocation as a function of time, for critical and non-critical tasks. It is assumed that three critical tasks, $T_1$, $T_3$, must be executed every second. Each of these tasks has a period of 1 second, a performance time of 0.1 second, and a maximum resource consumption rate of 2 megabits per second. Thus, after 0.3 seconds, each task has been executed and, at most, 0.6 megabit of memory has been allocated. This leaves a rate of 0.4 megabit per second available for non-critical tasks, which may use the remaining 0.7 seconds to allocate 0.4 megabits of memory.

A fourth critical task is the garbage collection task, which reclaims the 1 megabit of memory allocated by the other tasks every 1 second during a 0.1 second processing time. Alternatively, the garbage collection task may execute concurrently with the allocation tasks. In either case, an advantage of the invention is that scheduling of the garbage collection task, which should reclaim the proper amount of memory without using excess processor time, is simplified because the memory allocation rate is upper bounded.

To implement run-time scheduling, the local memory management routines of each task access a data structure that implements a task object. This data structure has two memory management fields for each task. A first field contains a value representing the maximum allocation per task activation, i.e., the task quota. The other field contains a counter.

Task quotas for critical tasks are sufficiently high to ensure the completion of the task; non critical task quotas are sufficiently low to ensure that non critical tasks do not prevent critical tasks from meeting their deadlines. An enhancement of the invention includes a means for dynamically adjusting allocation values according to current conditions and past behavior.

Figure 5:
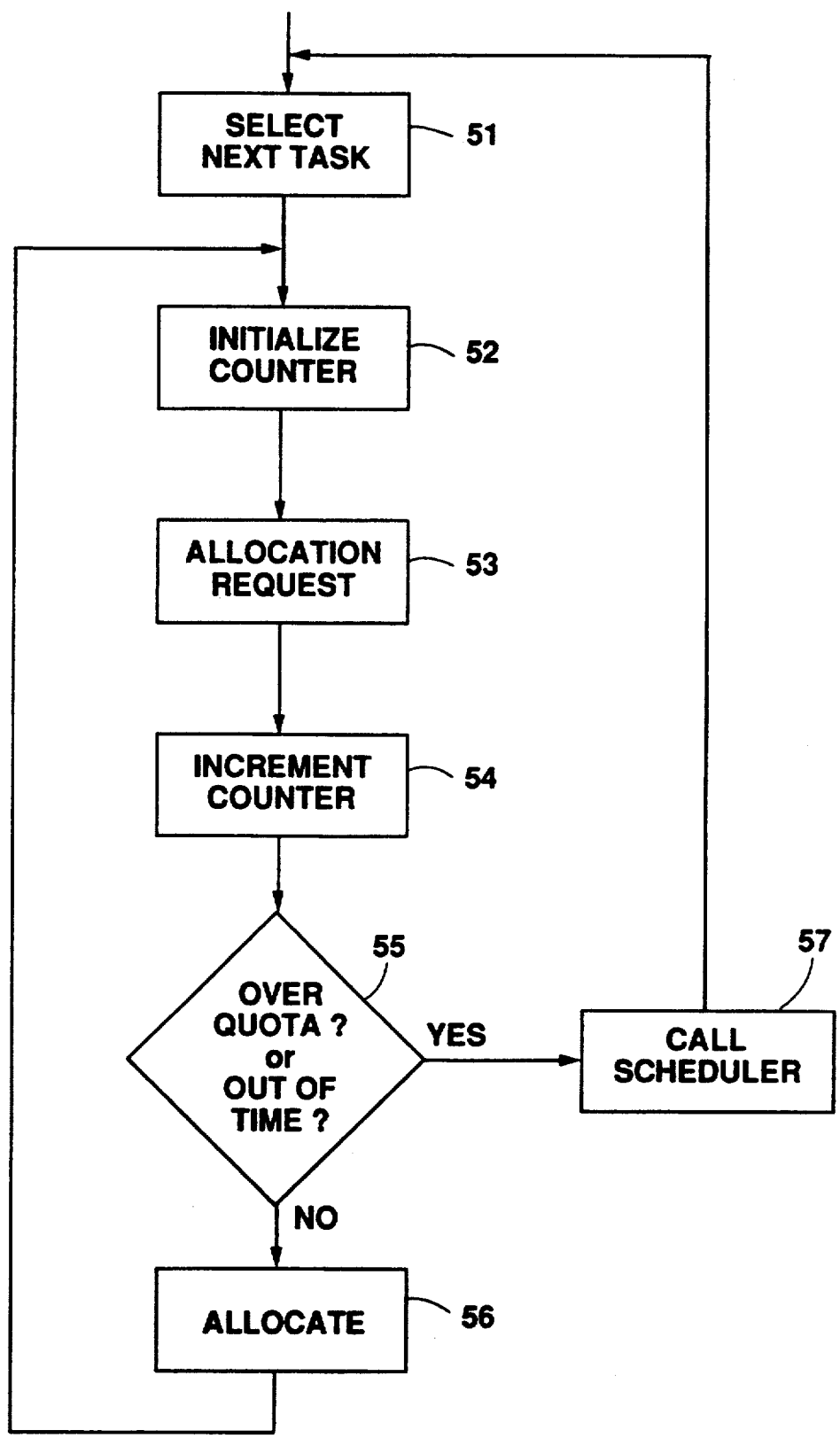
FIG. 5 illustrates a method of scheduling tasks in a real time system such that the consumption of allocated memory by non critical tasks does not prevent timely execution of critical tasks.

FIG. 5 illustrates the run-time operation of the invention. At any given time, at least one task is ready to run. In step 51, scheduler 25 selects a task from the ready queue. As discussed above, scheduler 25 operates in accordance with an algorithm that permits critical tasks to meet their deadlines.

In step 52, each time a task is activated, the counter field in its data record is initialized to zero. As the task executes, it makes allocation requests, as indicated by step 53. In step 54, for each request, allocator 32 increments the counter according to the amount of the resource that the task has requested.

In step 55, the current counter value is compared to the task quota. This comparison may be made by any routine, which may be incorporated or linked to allocator 32 or some other local memory management routine. Using known time scheduling techniques, it is also determined whether the task's time slice is exceeded.

If the counter value does not exceed the task quota and the task has remaining processor time, step 56 is providing the allocation, and the task continues to execute.

However, if the comparison of step 55 determines that a request will exceed the quota, or if the task has run out of processor time, step 57 is delivering a signal to scheduler 25, which suspends execution of the task. The preempted task is placed on the blocked task queue, and restarted by scheduler 25 at an appropriate time.

In this manner, the rate at which space in memory 22 is consumed is controlled by requiring each task to relinquish processor 21 until the beginning of its next period, if it attempts to consume more than its quota, or if it uses all of its processor time, during any activation. Although FIG. 5 is in terms of memory allocation, the same method could be used for any resource that is consumed in bits per unit of time.

Figure 7A:
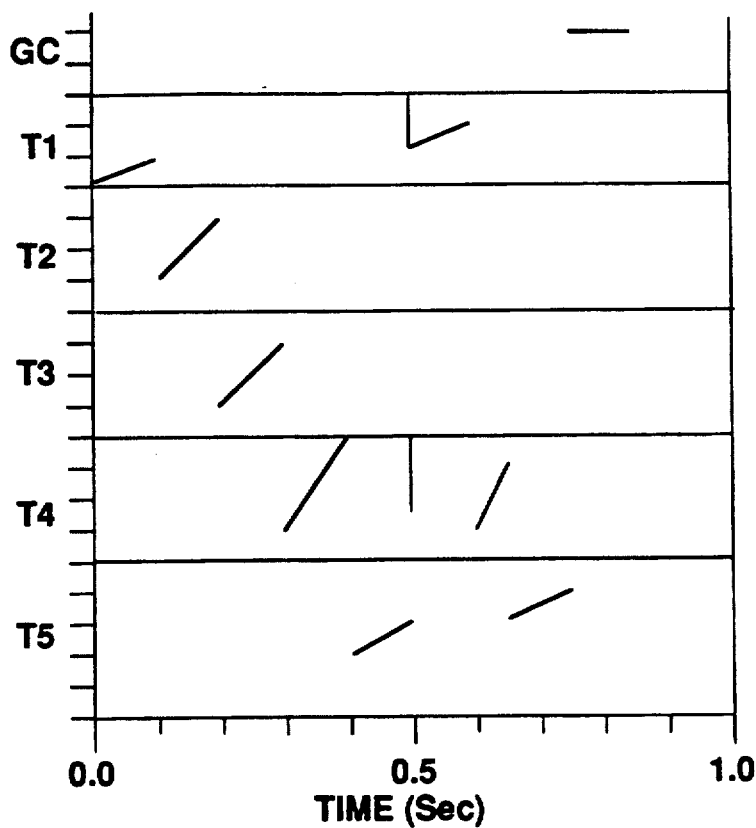
FIGS. 7A and 7B illustrate task scheduling of the tasks of FIG. 6 in accordance with the invention.
Figure 7B:
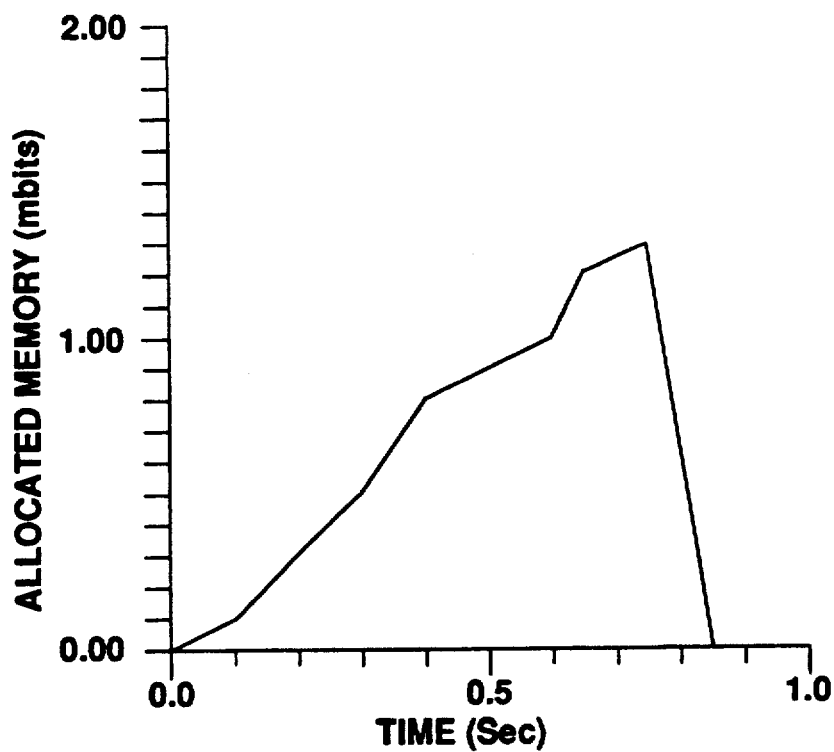

FIGS. 6, 7A, and 7B provide a detailed example of using the invention to schedule tasks that consume dynamically allocated memory and a garbage collection task. FIG. 6 sets out the parameters of the garbage collection task and 5 tasks (T1-T5) that consume allocated memory. Each task has a period, an execution time, a percent of total processor time, a maximum allocation rate, a percent of total allocation, an allocation quota and the actual amount of memory consumed by each activation of the task in FIG. 7A. The total allocation rate is 2 megabits per second, thus each task's maximum allocation rate is a portion of this total. It is assumed that the garbage collection task is capable of reclaiming memory at a rate of 2 megabits per second.

FIG. 7A illustrates the rate of consumption of each of task described in FIG. 6, relative to the task's period, execution time, and quota. It is assumed that the garbage collection task has the highest priority, with tasks T1-T5 have priority in descending order. The garbage collection task executes for 0.1 second at t =0.75 second. Each task T1-T5 is shown with its own graph, where the x axis represents time in seconds, bounded by the period of the task, and the y axis represents allocated memory in megabits, bounded by the task quota.

For example, T1 has a period of 0.5 second, and thus executes twice during a 1 second interval of processor time. It executes for 0.1 second, during which it consumes memory at a maximum rate of 0.4 megabits per second. Thus, its quota of 0.2 megabits is not exceeded, since it actually consumed 0.1 megabits. Likewise, T2 and T3 do not exceed their quotas. However, T4, during its first activation, attempts to exceed its quota and is preempted until its next period. T5, which has an execution time of 0.2 second, begins at 0.4 seconds is preempted at 0.5 second by the second execution of T1 and then by the resumption of T4. T5 resumes at 0.65 second and finishes at 0.75 second, at which time the garbage collector executes for 0.1 second to reclaim unused dynamically allocated memory.

FIG. 7B illustrates the sum of memory allocated by each task during the 1 second interval of FIG. 7A, as well as the memory reclaimed by the GC task. As indicated, the five tasks, T1-T5 consume 1.3 megabits of memory until GC begins at t=0.75 seconds and reclaims the memory.

OTHER EMBODIMENTS

Although the invention has been described with reference to specific embodiments, this description is not meant to be construed in a limiting sense. Various modifications of the disclosed embodiments, as well as alternative embodiments, will be apparent to persons skilled in the art. It is, therefore, contemplated that the appended claims will cover all modifications that fall within the true scope of the invention.

What is claimed is:

1. A method of scheduling tasks to be executed by a real time embedded computer system having a resource that is consumed in bits per unit of time, comprising:

associating a currently executing task with a maximum allocation value, wherein said maximum allocation value represents the maximum number of bits that said task may consume per activation;

counting, in terms of bits, the consumption of said resource, at intervals as said task executes;

comparing said consumption value with said maximum allocation value; and delivering a signal to a scheduler, if said counter value exceeds said maximum allocation value, which indicates that said task must discontinue execution.

2. The method of claim 1, wherein said resource is dynamically allocated and reclaimed memory.

3. The method of claim 2, and further comprising the step of scheduling a garbage collection task.

4. The method of claim 2, wherein said counting step and said comparing step are linked to a local allocator of a program executing said task.

5. The method of claim 1, wherein said resource is a communications link having a capacity of n bits per second.

6. The method of claim 1, wherein said task is a critical task, such that said maximum allocation value has been determined to permit said task to meet system deadlines.

7. The method of claim 1, wherein said task is a non critical task and said maximum allocation value has been determined so that said non critical task will not prevent timely execution of critical tasks.

8. The method of claim 1, wherein said task executes within a time slice of a processor of said computer system, and said task is required to discontinue execution if either said time slice has expired or said counter value exceeds said maximum allocation value.

9. The method of claim 1, and further comprising the step of dynamically adjusting said maximum allocation value.

10. A computer system for executing application programs in hard real time and programmed with automatic memory management programming, comprising:

a central processing unit for executing application programs and operating system programs;

a computer memory for storing said programs and data operated on by said programs;

a garbage collector for reclaiming memory allocated by said application programs;

a counter for incrementing an allocation value according to the allocation requests of a current task of said program;

a comparator for comparing the current value of said counter to a maximum allocation value stored in said memory and associated with said current task; and a scheduler for determining which tasks are to be processed by said central processing unit, wherein said scheduler receives a signal from said comparator if said counter value exceeds said maximum allocation value, and in response to said signal, causes said current task to temporarily cease execution.

11. The system of claim 10, wherein said counter and said comparator are software routines linked to a local allocation routine of said automatic memory management programming.

12. The system of claim 10, wherein said counter and said comparator are implemented as hardware devices.

13. A task controller for a real time embedded computer system having a resource that is consumed in bits per unit of time, comprising:

a memory for storing maximum allocation values for tasks to be executed by the computer system;

a counter for counting allocation requests of a currently executing task;

a comparator for comparing a maximum allocation value of said currently executing task with the output of said counter;

communication means for delivering a signal to a system scheduler, if said output of said counter exceeds said maximum allocation value, with respect to said currently executing task.

14. The task controller of claim 13, wherein said counter and said comparator are software routines linked to local allocation routine of said automatic memory management programming.

15. The task controller of claim 13, wherein said counter and said comparator are implemented as hardware devices.

16. The task controller of claim 13, wherein said resource is dynamically allocated memory.

17. The task controller of claim 16, and further comprising a schedule for scheduling a garbage collection task.

18. The task controller of claim 13, wherein said resource is a communications link having a capacity of n bits per second.

19. The task controller of claim 13, wherein said task is a critical task, such that said maximum allocation value has been determined to permit said task to meet system deadlines.

20. The task controller of claim 13, wherein said task is a non critical task and said maximum allocation value has been determined so that said non critical task will not prevent timely execution of critical tasks.

* * * * *